US006299233B1

(12) United States Patent
Mentink (10) Patent No.: US 6,299,233 B1
(45) Date of Patent: Oct. 9, 2001

(54) CONVERTIBLE TOP ASSEMBLY WITH HYDRAULIC ACTUATING DEVICE

(75) Inventor: Laurentius A. G. Mentink, Haaksbergen (NL)

(73) Assignee: Actuant Corporation, Glendale, WI (US)

(*) Notice: Subject to any disclaimer, the term of this patent is extended or adjusted under 35 U.S.C. 154(b) by 0 days.

(21) Appl. No.: 09/568,763

(22) Filed: May 11, 2000

(30) Foreign Application Priority Data

May 14, 1999 (NL) .................................................... 1012064

(51) Int. Cl.$^7$ ........................................................ B60J 7/00
(52) U.S. Cl. ......................... 296/107.09; 296/117; 60/352
(58) Field of Search .............................. 296/107.09, 117; 91/465; 60/452

(56) References Cited

U.S. PATENT DOCUMENTS

| 2,128,849 | * | 8/1938 | Redfern ................................. 296/117 |
| 2,169,340 | * | 8/1939 | Falcon .................................. 296/117 |
| 2,331,603 | * | 10/1943 | Falcon .................................. 296/117 |
| 2,346,387 | * | 4/1944 | Parsons ................................. 296/117 |
| 2,622,400 | * | 12/1952 | Greer ................................... 296/117 |
| 2,704,226 | * | 3/1955 | Orr ..................................... 296/117 |
| 4,601,641 | * | 7/1986 | Kuroyanhi et al. .................... 417/220 |
| 4,605,359 | * | 8/1986 | Suzuki et al. ......................... 417/270 |
| 4,627,793 | * | 12/1986 | Kuroyanagi et al. .................. 417/203 |
| 4,776,768 | * | 10/1988 | Kondoh et al. ....................... 417/271 |
| 4,976,106 | * | 12/1990 | Noerskau et al. ..................... 60/452 |
| 5,187,933 | * | 2/1993 | Nikolaus .............................. 60/452 |
| 5,533,334 | * | 7/1996 | Takeuchi et al. ................... 60/452 X |
| 5,542,823 | * | 8/1996 | de Jong et al. ...................... 417/273 |
| 5,682,807 | * | 11/1997 | Mentink ........................... 296/107 X |
| 5,724,878 |   | 3/1998 | Stolle et al. ........................... 91/165 |
| 6,089,248 | * | 7/2000 | Rost ................................. 60/452 X |

FOREIGN PATENT DOCUMENTS

| 19722495 A1 | 12/1997 | (DE) . |
| 0425156 A2 | 10/1990 | (EP) . |
| 1002292 | 2/1996 | (NL) . |

OTHER PUBLICATIONS

Search Report of NL Appln. No. 1012064, dated Oct. 8, 1999 (with English translation).

* cited by examiner

Primary Examiner—Joseph D. Pape
Assistant Examiner—Lori L. Coletta
(74) Attorney, Agent, or Firm—Quarles & Brady LLP (57) ABSTRACT

Convertible top assembly for a vehicle with a passenger compartment, comprising a convertible top which can move between a closed position, in which the convertible top covers the passenger compartment of the vehicle, and an open position, in which the passenger compartment is open, and a hydraulic actuating device for moving one or more components of the convertible top assembly, the actuating device comprising a hydraulic pump with an associated drive motor and a reservoir for hydraulic fluid, as well as one or more hydraulic actuators, the actuators acting on the convertible top assembly and the pump being designed to supply pressurized hydraulic fluid to the actuators.

The actuating device comprises control means which are designed to regulate the volumetric output of the pump while the convertible top assembly is being actuated.

13 Claims, 3 Drawing Sheets

CONVERTIBLE TOP ASSEMBLY WITH HYDRAULIC ACTUATING DEVICE

FIELD OF THE INVENTION

The present invention relates to a hydraulically actuated convertible top assembly for a vehicle having a passenger compartment. Said convertible top assembly comprises a convertible top which is displaceable between a closed position, in which said convertible top covers the passenger compartment of the vehicle, and an open position, in which the passenger compartment is open. Said convertible top assembly further comprises a hydraulic actuating device for actuating one or more components of the convertible top assembly. The hydraulic actuating device comprises a hydraulic pump with an associated drive motor and a reservoir for hydraulic fluid, as well as one or more hydraulic actuators, the hydraulic actuators acting on said convertible top assembly. The pump is connectable to said hydraulic actuators for supplying pressurized hydraulic fluid to said hydraulic actuators.

BACKGROUND OF THE INVENTION

Convertible top assemblies with one or more hydraulically driven components are generally known, e.g from EP 0 425 156. In a known simple design, the hydraulic actuating device comprises a single hydraulic actuator for moving the convertible top, but in many cases there are a plurality of components which are each driven by one or more associated hydraulic actuators, for example the convertible top (which may comprise either a foldable cover or one or more rigid cover parts), the tonneau cover, one or more latches and, in the case of convertible tops with a foldable cover, the bow for tensioning the fabric.

One of the functions which is often carried out hydraulically is the movement of the convertible top itself from the open position to the closed position and vice versa. The hydraulic pressure which is required in order to carry out these movements is relatively low throughout most of these movements. However, in the vicinity of the end positions of the convertible top, it is often necessary to supply a greater force, for example in order to compress a sealing strip between the convertible top and the header above the windscreen, or owing to the relatively unfavourable engagement of the convertible top actuators on the convertible top in the open position. It may also be desirable/necessary to supply a greater force at other moments during the movement. Furthermore, some actuators have only a small active piston surface, so that a relatively great hydraulic pressure is required in order for these actuators to be able to drive the associated component. For example, in a number of convertible top assemblies one or more latches are hydraulically actuated, and the actual hydraulic actuators associated with these latches are often extremely small, in particular owing to the limited fitting space, and therefore require a high hydraulic pressure in order to drive the latch.

A significant drawback of the known hydraulically actuated convertible top assemblies is that it takes an undesirably long time to open and close the convertible top, while the market demands convertible top assemblies which work increasingly quickly.

OBJECT OF THE INVENTION

The object of the present invention is to provide measures which allow a rapidly operating convertible top assembly to be produced.

SUMMARY OF THE INVENTION

The present invention provides a convertible top assembly of the above kind wherein the actuating device comprises control means which are adapted to regulate the volumetric output of the pump while the convertible top assembly is being hydraulically actuated.

In the known convertible top assemblies the pump and the associated electric drive motor of the hydraulic actuating device are adapted to the highest pressure level which has to be delivered by the pump in order to actuate the actuators of the convertible top assembly. The known pumps which are used for this purpose are of the type which have a constant volumetric output per revolution of the pump shaft, the so-called fixed displacement type, despite the fact that, partly owing to leakage losses in the pump, this volumetric output is often not entirely constant, but rather decreases as the hydraulic pressure to be delivered increases. The electric motor is usually a small low-voltage DC motor able to deliver a limited maximum power for driving the pump. This limitation stems, inter alia, from the electric current taken up, the cost, the volume of the motor and the weight of the motor.

Since the pump/motor combination is adapted to those moments during actuation of the convertible top assembly at which the highest hydraulic pressure is required, in the known convertible top assemblies functions (movements of hydraulically driven components) which require a relatively lower pressure than the maximum pressure required are carried out with incomplete utilization of the available drive motor power. This is because the power required by the pump can be seen as the arithmetic product of the outputted hydraulic pressure and the hydraulic output (volumetric flow rate).

The convertible top assembly according to the invention provides for the pump volumetric output to be controlled, making it possible to vary the volumetric output during actuation of the convertible top assembly, in steps and/or continuously, between various values. As a result, the speed at which the hydraulic actuators carry out their driving movement can be controlled. It is thus possible for the volumetric output to be set to one value for the actuation of one specific actuator and for the volumetric output to be set to a different value for the subsequent actuation of a different actuator. However, it is also possible for the volumetric output to be controlled continuously during the actuation of one or more actuators, in particular as a function of the hydraulic pressure. The volumetric output control makes it possible to control the speed at which the functions are carried out, which is advantageous, for example, if a plurality of movements of components of the convertible top assembly are to take place.

Preferably, the control means are designed such that the speed of the hydraulic actuation of the one or more hydraulically driven components of the convertible top assembly, in particular of the movement of the convertible top itself, is optimized on the basis of the maximum power which the drive motor can deliver. With a volumetric output control of this nature, it is possible to carry out each function at the maximum possible speed within the range of the motor power which can be delivered. As a result, a specific (electric) motor can be utilized optimally, and it has been found that, by using the same electric motor as that currently used, it is possible for a convertible top assembly to operate many tens of percents more quickly.

Preferably, the control means are designed such that, if the hydraulic pressure required for the hydraulic actuation of an actuator is lower than a maximum hydraulic pressure which is required during the actuation of the convertible top assembly, the pump volumetric output is set to a higher value than the volumetric output of the pump at the maximum hydraulic pressure. As a result, a function, or a part of a function, of the convertible top assembly which requires a relatively low hydraulic pressure can be performed with a greater volumetric pump output than a function or another part of this function which requires a higher pressure.

The volumetric output control may also be used to protect the (electric) motor from overload, if the control means are designed in such a manner that the arithmetic product of the hydraulic pressure and the volumetric output by the pump is at most equal to the maximum motor power which can be delivered. In the same way, the control can be used to limit the pressure of the hydraulic system by reducing the volumetric output at high pressures, thus preventing a further pressure increase. In one embodiment thereof, it is possible for the pump volumetric output to be set to zero, if the pressure has reached a maximum permissible value.

In order to achieve the as rapid actuation of the convertible top assembly as possible, it is possible for the control means to be designed in such a manner that over as much as possible of the hydraulic actuation of the convertible top assembly the arithmetic product of the hydraulic pressure and the volumetric output delivered by the pump is substantially constant.

The control means may be of electronic design, but may also operate mechanically, or alternatively combinations of these options are possible.

The convertible top assembly according to the invention will be further explained in the following description with reference to the drawings.

DETAILED DESCRIPTION OF THE DRAWINGS

Figure 1:
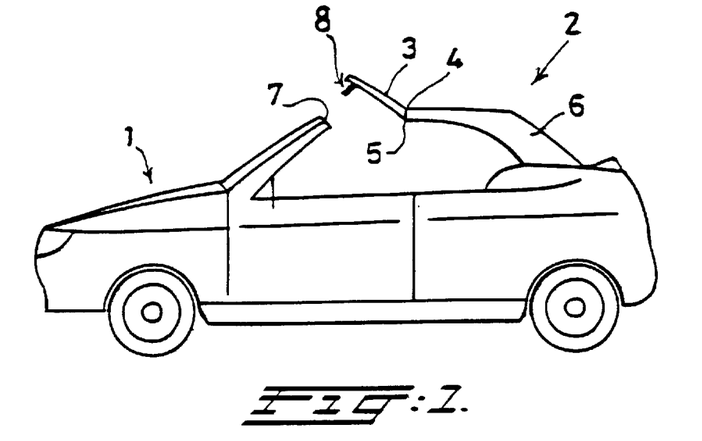
FIG. 1 diagrammatically depicts a side view of a vehicle with a convertible top assembly according to the invention, FIG. 2 diagrammatically depicts a perspective view of the convertible top assembly from FIG. 1, FIGS. 3a, 3b diagrammatically depict a radial plunger pump with a controllable output.

FIG. 1 shows a convertible type vehicle 1 having a convertible top which is embodied in this example as a folding roof 2 of a mechanical design which is known per se and which can be used to open or close a passenger compartment of the vehicle 1.

The folding roof 2 has a front folding-roof part 3 which is attached to a rearward part 6 of the folding roof 2 via a pivoting attachment 4 about a pivot axis 5.

In FIG. 1, the folding roof 2 is shown in a pre-closure position, in which the front folding-roof part 3 is in an upwardly pivoted position with respect to the closed position of the folding roof 2.

To latch the folding roof 2 in the closed position, a hydraulically actuated latching member 8 is provided on the front folding-roof part 3, which latching member 8, when actuated, can be brought into engagement with an associated catch feature (not shown) in a windscreen header 7 of the vehicle 1.

Figure 2:
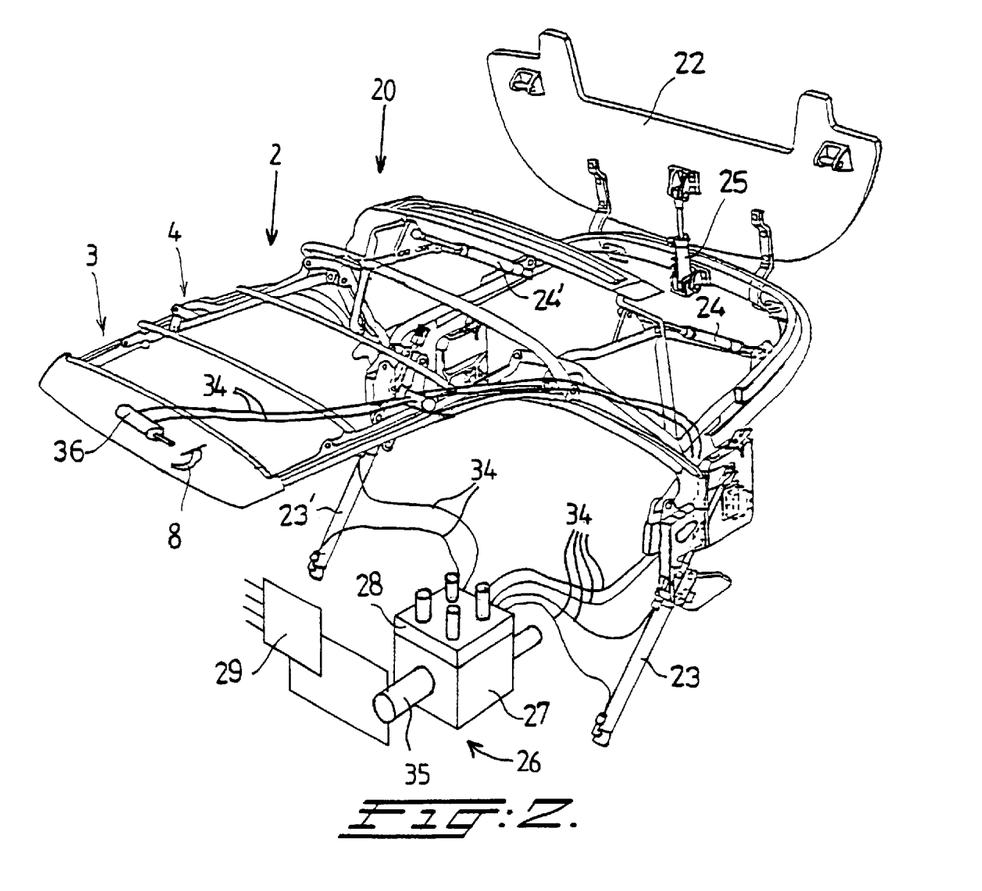

FIG. 2 shows a folding-roof assembly 20 comprising the folding roof 2 and a tonneau cover 22 for covering a storage compartment of the vehicle 1 for storing the folding roof 2 in the open position.

The movements of the folding roof 2 and the tonneau cover 22 are brought about by means of a hydraulic actuating device.

The hydraulic actuating device comprises two pairs of hydraulic cylinders 23, 23', 24, 24' for moving the folding roof 2, a hydraulic cylinder 25 for moving the tonneau cover 22 and a hydraulic cylinder 36 for operating the latching member 8. The cylinders 23–25, 36 are connected, via associated hydraulic hoses 34, to a hydraulic pump unit 26.

The pump unit 26 comprises a pump 27 driven by an associated electric drive motor 35, a valve manifold 28 with multiple valves and an associated electronic control unit 29. Said control unit 29 is connected to said drive motor 35 and said valves so that the movements of the various components of the convertible top 20 can be brought about automatically.

Pressurized fluid is supplied by the pump 27 to the respective cylinders 23–25, 36 via the valve manifold 28, so that these cylinders 23–25, 36 are able to move the associated components of the convertible top assembly 20.

The speed at which each of the cylinders 23–25, 36 executes its movement depends on the amount of hydraulic fluid which is fed to said cylinder 23–25, 36 per unit time.

The hydraulic actuating device comprises control unit 29 which is designed to control the volumetric output of the pump 27 during actuation of the convertible top assembly 20.

In a preferred embodiment the control unit 29 is designed in such a manner that over as much as possible of the actuation of the convertible top assembly 20 the arithmetic product of the hydraulic pressure and the volumetric output by the pump 27 is substantially constant. This control is based on the fact that the electric motor 35 which drives the pump 27 has a specific maximum power which it can deliver, which maximum power, if appropriate, may be higher than the standard power which can be outputted by said motor 35 in view of the short time for which the electric motor 35 is operating for the movement of the folding roof 2. In practice, it will be attempted to move the folding roof 2 from the open position to the volumetric output of the pump 27 is based on the fact that at any moment of the actuation the hydraulic pressure required at that moment is delivered in order to carry out the movement, and that the volumetric output is then adjusted to the maximum possible value, obviously within the range which is permissible for the motor. As a result, the movements can be carried out as quickly as possible, the movements which require a high pressure taking place with a low pump volumetric output and the movements which require a low pressure taking place with a higher pump volumetric output.

Obviously, for each pump there can be a maximum and minimum pump volumetric output, and the volumetric output is controlled within the intervening range.

In a possible embodiment the pump 27 is a fixed displacement pump and is driven by an electric motor 35 with a controllable rotational speed, in which case the control unit 29 is designed to control the rotational speed of the electric motor 35 and thereby the volumetric output of the pump.

In a particular embodiment, the pump could be driven by an electric motor of the type which has a constant power output. The volumetric output of the pump (which is dependent on the number of revolutions of the drive shaft) is partly determined by the resistance which the pump encounters while the hydraulic fluid is being pressurized and thus increases or reduces the torque required from the drive motor.

In another variant, which in practice is simple to carry out, the pump itself is a variable delivery pump having a variable volumetric output, so that the pump volumetric output per revolution of the drive shaft of the pump can be adjusted. In this case, consideration may be given, for example, to a plunger pump, in which case the pump stroke of the plunger (s) is controllable. This is achieved, for example, through the use of an axial plunger pump or a radial plunger pump as shown in FIGS. 3a,b.

By controlling the output of the pump, it is also possible to define the speed of a specific movement and a specific movement can be carried out with a definite speed profile, for example in such a manner that the folding roof 2 moves slowly in the vicinity of the end positions and faster between these positions.

Figure 3A:
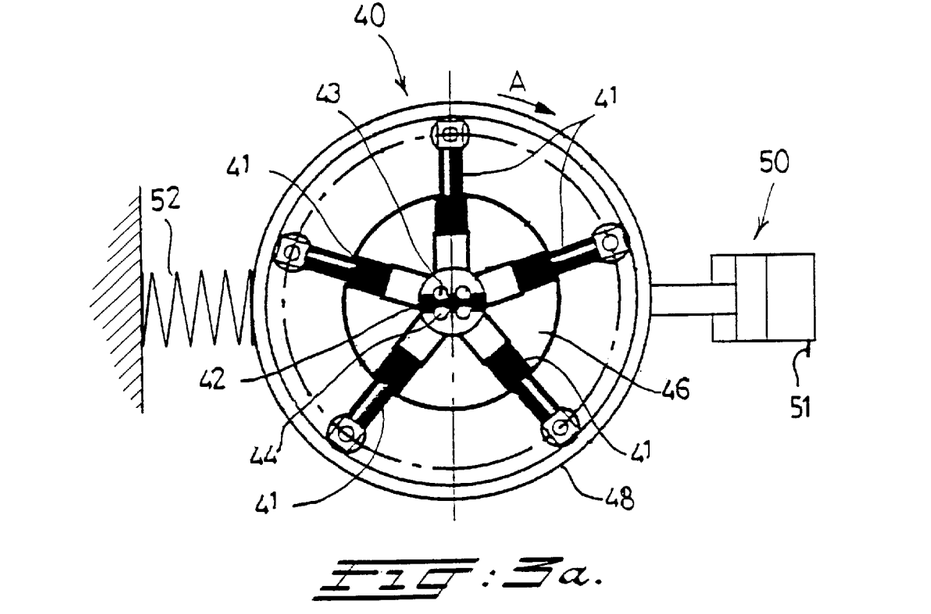
Figure 3B:
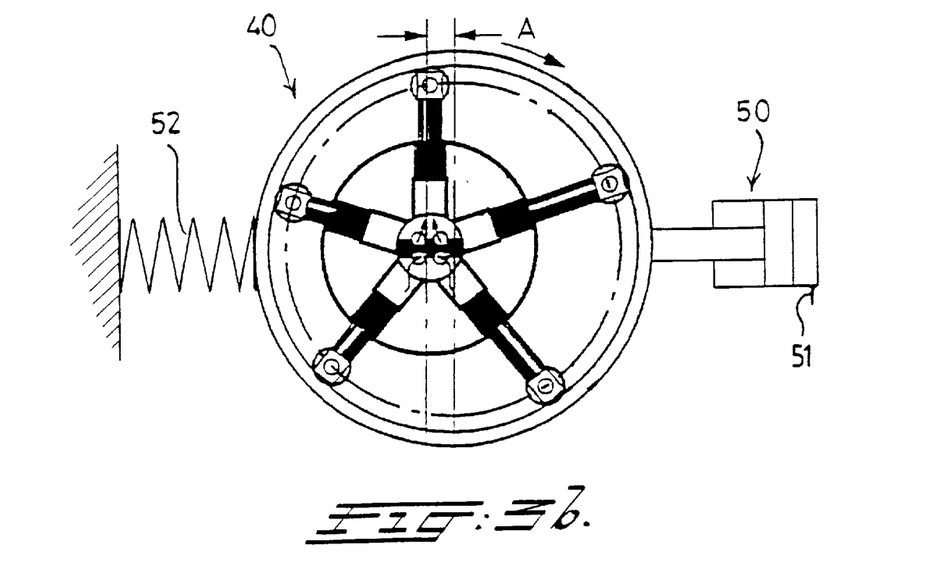

FIGS. 3a and 3b diagrammatically depict a radial plunger pump 40 with adjustable stroke of the plungers 41 which can be used in the convertible top assembly as disclosed hereinbefore.

The pump 40 has a stator pintle 42 with a suction duct 43 and a output duct 44. A rotor 46, in which the five plungers 41 are accommodated in such a manner that they can reciprocate in associated cylinders in the rotor 46 which rotates about the stator pintle 42. In the embodiment shown, a running wheel is located at the radial end of each plunger 41, by means of which wheel the plunger 41 is supported on an eccentric ring 48.

The eccentricity of the eccentric ring 48 with respect to the stator pintle 42 can be adjusted by means of a hydraulic adjustment actuator 50 with a connection 51 for pressurized hydraulic fluid. Diametrically opposite the actuator 50 there is a biassing spring 52 arranged between the housing of the pump and the eccentric ring 48, which presses the eccentric ring 48 in the opposite direction.

The connection 51 of the adjustment actuator 50 may be directly connected to a port of the pump 40, so that the volumetric output is controlled on the basis of the hydraulic pressure delivered by the pump.

The pump 40 shown is suitable for being driven in two directions and thus for pumping liquid in two directions, arrow A indicating one of these, the direction of rotation of the rotor.

It can be seen from FIG. 3a that by applying hydraulic pressure to the connection 51 of the actuator 50 the eccentric ring 48 adopts a coaxial position with respect to the stator shaft 42, so that the eccentricity of the eccentric ring 48 is zero. This zero volumetric output may be useful in order in this way to limit the pressure in the hydraulic actuating device, since the pump then in fact no longer pumps any liquid.

If the actuators of the convertible top assembly encounter little resistance, the pressure in the line 51 will be low and the spring 52 will prevail over the adjustment actuator 50, so that the eccentricity of the plunger pump is great and therefore the pump volumetric output is also great (cf. FIG. 3b). If the actuator(s) in operation is (are) subject to a higher resistance, the pressure in the line 51 will rise and the adjustment actuator 50 will displace the eccentric ring 48 towards a smaller eccentricity, counter to the spring 52 (in the direction of FIG. 3a), so that the eccentricity of the plunger pump 40 is reduced and the volumetric output will decrease. At this lower volumetric output, it will then be possible, on the basis of the motor power of the drive motor, to supply a higher hydraulic pressure.

If the adjustment actuator 50 and the spring 52 (in particular the spring constant and any preload) are dimensioned correctly, it is possible to ensure that the product of hydraulic pressure and volumetric output remains as far as possible at a constant value, in the vicinity of the power which can be delivered by the (electric) motor (not shown).

The adjustment of the eccentricity during normal operation of a convertible top assembly may in practice lie in a range between 1.25 and 2.5 millimetres, for a output of between 600 and 1200 cc/min and a pressure which lies between 150 and 75 bar.

In the embodiment of the plunger pump shown, the cylinders for the plungers are provided in the rotor. However, it is also conceivable for the cylinders to be provided in the stator housing and for the rotor to rotate about an eccentric shaft.

In a particular embodiment of the invention, the hydraulic adjustment actuator 50 is provided with a stepped piston with a plurality of active surfaces which can be separately connected to a pressure source in order, in this way, to use the actuator to create different force levels and thus different settings of the eccentricity of the eccentric ring 48. The adjustment actuator could also be designed as a tandem cylinder in order, in this way, to obtain different settings of the pump output.

In a variant, the adjustment of the eccentricity may take place not hydraulically but rather, for-example, using an (electrically driven) threaded spindle. In this case, it is preferable for the latter to be controlled on the basis of the hydraulic pressure measured by a pressure sensor.

Figure 4:
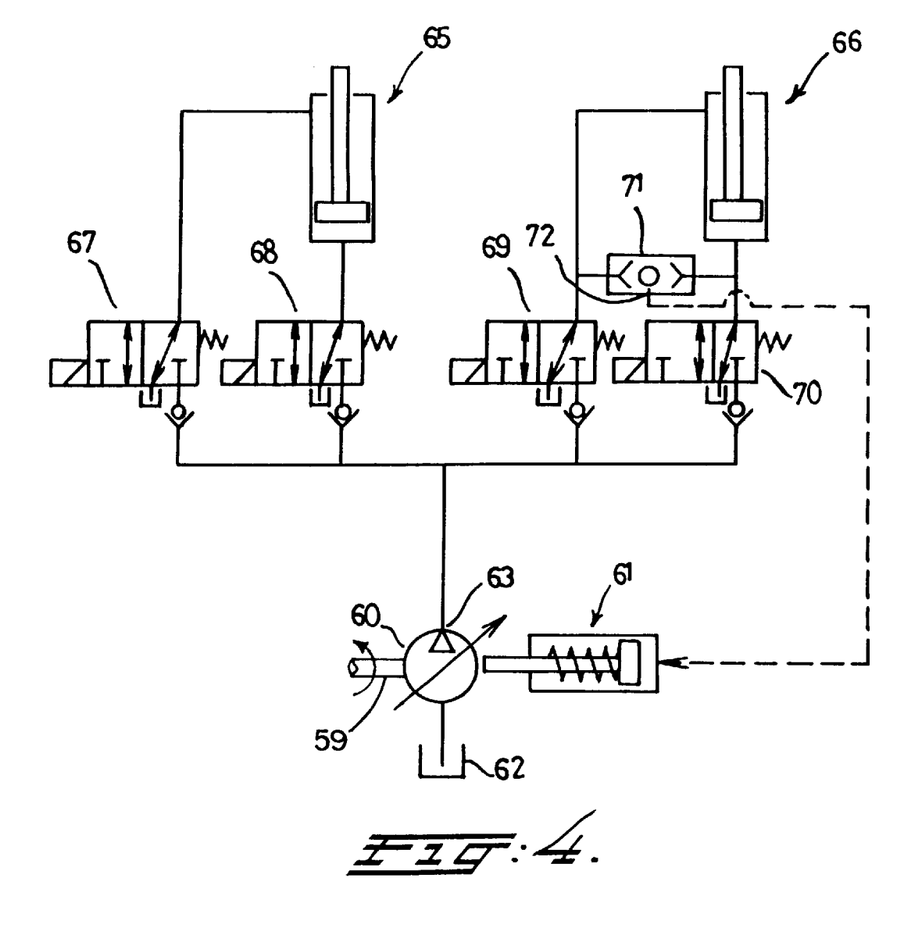
FIG. 4 shows a hydraulic circuit diagram of a hydraulic actuating device for a convertible top assembly according to the invention.

FIG. 4 shows the hydraulic circuit diagram of a simple design of the hydraulic actuating device of a convertible top assembly according to the invention. The circuit diagram shows a pump 60 with a controllable output provided with a hydraulic adjustment actuator 61 for controlling the output. The pump 60 is driven by shaft 59 and sucks in liquid from reservoir 62. The pump 60 has a output port 63.

The actuating device furthermore comprises a hydraulic actuator 65 which is used, for example, to move the main bow of the convertible top assembly. Furthermore, there is an actuator 66 which is used, for example, to move a tonneau cover. In this case, the movement of the tonneau cover actuator 66 requires a higher hydraulic pressure than that required for the main bow actuator 65.

Each of the connections of the actuator 65 can be connected, via an associated electrically actuable valve 67 or 68, to the output port 63 of the pump or to the reservoir 62. Each of the connections of the actuator 66 can also be connected via an associated valve 69, 70 to the output port 63 or to the reservoir 62. Both connections of the actuator 66 are also connected to an OR-valve 71, which has an outlet port 72 which is in communication with the adjustment actuator 61.

If one of the valves 69, 70 or both valves 69, 70 are now actuated, the adjustment actuator 61 is connected to the output port of the pump 63 and the above-described control of the output of the pump 60 takes place.

It will be clear that the control line to the hydraulic adjustment actuator 50, 61 may be connected into the hydraulic circuit diagram at a location which is such that the pump output is controlled at the desired moment. It would also be possible for a separately actuable valve to be incorporated in the control line, but it is preferable for the hydraulic pressure of the adjustment actuator of the pump to be controlled using the valves which are already required for activation of the actuators, if appropriate in combination with one or more OR-valves and/or AND-valves, as in the previous example.

In a design of the inventive idea which is not shown, there is provision for the pump itself to be unable to control the volumetric output and for the control to be effected by means of the rotational speed of the electric drive motor. This could, for example, take place using pulse width modulation of the power supply to the motor. In practice, however, this is less advantageous than the solution described above, since the low-voltage motors which are currently used are supplied with high current intensities (up to 30 amps), and controlling these motors requires expensive components. Furthermore, the control range is relatively limited, for example between 60 and 100% of the maximum rotational speed, while the solution described above permits a much greater control range. However, in the event of any increase in the voltage of the vehicle battery, it is conceivable that controlling the pump volumetric output in this way may also become attractive.

In another variant, a specific type of electric motor is used to drive a further pump which cannot be controlled. In this case, the motor, within a defined range, has a characteristic which is such that a constant power output is obtained. The pump volumetric output is then controlled by the characteristic of the electric motor.

What is claimed is:

1. A convertible top assembly for a vehicle having a passenger compartment, said convertible top assembly comprising:
   a convertible top which is displaceable between a closed position, in which said convertible top covers the passenger compartment of the vehicle, and an open position, in which the passenger compartment is open,
   a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators,
      wherein said hydraulic actuating device furthermore comprises control means for regulating the volumetric output of the pump while one or more components of the convertible top assembly are being actuated; and
         wherein said control means are designed such that, if the hydraulic pressure required for the hydraulic actuation of an actuator is lower than a maximum hydraulic pressure which is required during the actuation of the convertible top assembly, said pump volumetric output is set to a higher value than the volumetric output of the pump at the maximum hydraulic pressure.

2. A convertible top assembly for a vehicle having a passenger compartment, said convertible top assembly comprising:
   a convertible top which is displaceable between a closed position, in which said convertible top covers the passenger compartment of the vehicle, and an open position, in which the passenger compartment is open,
   a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators,
      wherein said hydraulic actuating device furthermore comprises control means for regulating the volumetric output of the pump while one or more components of the convertible top assembly are being actuated; and
         wherein said drive motor for driving said pump has a maximum motor power which can be outputted, and wherein said control means are designed such that the arithmetic product of the hydraulic pressure and the volumetric output delivered by the pump is at most equal to the said maximum motor power which can be delivered.

3. A convertible top assembly for a vehicle having a passenger compartment, said convertible top assembly comprising:
   a convertible top which is displaceable between a closed position, in which said convertible top covers the passenger compartment of the vehicle, and an open position, in which the passenger compartment is open,
   a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators,
      wherein said hydraulic actuating device furthermore comprises control means for regulating the volumetric output of the pump while one or more components of the convertible top assembly are being actuated; and
         wherein said control means are designed such that over a significant part of the hydraulic actuation of the convertible top assembly, the arithmetic product of the hydraulic pressure and the volumetric output delivered by the pump is substantially constant.

4. A convertible top assembly for a vehicle having a passenger compartment, said convertible top assembly comprising:
   a convertible top which is displaceable between a closed position, in which said convertible top covers the passenger compartment of the vehicle, and an open position, in which the passenger compartment is open,
   a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators,
      wherein said hydraulic actuating device furthermore comprises control means for regulating the volumetric output of the pump while one or more components of the convertible top assembly are being actuated; and wherein said control means comprise a pressure sensor for measuring the hydraulic pressure delivered by the pump.

5. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump has a rotatable drive shaft and has a substantially constant volumetric output per revolution of the drive shaft, and wherein said control means are designed to regulate the rotational speed of the drive shaft.

6. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump has a rotatable drive shaft, and wherein said control means are designed to regulate the pump volumetric output per revolution of the drive shaft.

7. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump is a plunger pump having one or more reciprocable plungers, the stroke of the plungers being adjustable, said pump having a rotatable drive shaft connected to said drive motor, and wherein said control means are designed to regulate the pump volumetric output per revolution of the drive shaft.

8. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump is a radial plunger pump having one or more reciprocable plungers, the stroke of the plungers being adjustable, said pump having a rotatable drive shaft connected to said drive motor, and wherein said control means are designed to regulate the pump volumetric output per revolution of the drive shaft.

9. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump is a plunger pump having one or more reciprocable plungers, the stroke of the plungers being adjustable, said pump having a rotatable drive shaft connected to said drive motor, and wherein said control means are designed to regulate the pump volumetric output per revolution of the drive shaft, and wherein said pump has an eccentric element, the eccentricity of which determines the stroke of the plungers, and wherein the eccentricity of the eccentric element is adjustable, and wherein said control means comprise adjustment means associated with the plunger pump for adjusting the eccentricity of the eccentric element.

10. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump is a plunger pump having one or more reciprocable plungers, the stroke of the plungers being adjustable, said pump having a rotatable drive shaft connected to said drive motor, and wherein said control means are designed to regulate the pump volumetric output per revolution of the drive shaft, and wherein said pump has an eccentric element, the eccentricity of which determines the stroke of the plungers, and wherein the eccentricity of the eccentric element is adjustable, and wherein said control means comprise adjustment means associated with the plunger pump for adjusting the eccentricity of the eccentric element, and wherein said adjustment means comprise a spring means and an adjustment actuator, the adjustment actuator being adapted to move the eccentric element counter to the force of the spring means.

11. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein said pump is a plunger pump having one or more reciprocable plungers, the stroke of the plungers being adjustable, said pump having a rotatable drive shaft connected to said drive motor, and wherein said control means are designed to regulate the pump volumetric output per revolution of the drive shaft, and wherein said pump has an eccentric element, the eccentricity of which determines the stroke of the plungers, and wherein the eccentricity of the eccentric element is adjustable, and wherein said control means comprise adjustment means associated with the plunger pump for adjusting the eccentricity of the eccentric element, and wherein said adjustment means comprise a spring means and an adjustment actuator, the adjustment actuator being adapted to move the eccentric element counter to the force of the spring means, and wherein said adjustment actuator is a hydraulic actuator.

12. Convertible top assembly according to claim 11, wherein said pump is a plunger pump having one or more reciprocable plungers, the stroke of the plungers being adjustable, said pump having a rotatable drive shaft connected to said drive motor, and wherein said control means are designed to regulate the pump volumetric output per revolution of the drive shaft, and wherein said pump has an eccentric element, the eccentricity of which determines the stroke of the plungers, and wherein the eccentricity of the eccentric element is adjustable, and wherein said control means comprise adjustment means associated with the plunger pump for adjusting the eccentricity of the eccentric element, and wherein said adjustment means comprise a spring means and an adjustment actuator, the adjustment actuator being adapted to move the eccentric element counter to the force of the spring means, and wherein said adjustment actuator is a hydraulic actuator, and wherein said hydraulic adjustment actuator comprises a piston with a plurality of active surfaces and associated working chambers for creating an actuator force which can be adjusted between a plurality of different values.

13. A convertible top assembly for a vehicle having a passenger compartment, said convertible top assembly comprising:

a convertible top which is displaceable between a closed position, in which said convertible top covers the passenger compartment of the vehicle, and an open position, in which the passenger compartment is open, a hydraulic actuating device for actuating one or more components of the convertible top assembly, the hydraulic actuating device comprising a hydraulic pump with an associated drive motor and a reservoir for hydraulic fluid, as well as one or more hydraulic actuators, the hydraulic actuators acting on said convertible top assembly, said pump being connectable to said hydraulic actuators for supplying pressurized hydraulic fluid to said hydraulic actuators, wherein said hydraulic actuating device furthermore comprises control means for regulating the volumetric output of the pump while one or more components of the convertible top assembly are being actuated; and wherein a plurality of hydraulic actuators are present for the purpose of actuating the convertible top assembly, and wherein the hydraulic actuating device comprises actuable valve means for activating the actuators in a desired movement sequence, and wherein said control means are designed such that the pump volumetric output is controlled as a function of the actuation of the actuable valve means.

* * * * *